United States Patent
Katayama et al.

(10) Patent No.: US 7,356,360 B2
(45) Date of Patent: Apr. 8, 2008

(54) RADIO COMMUNICATION SYSTEM

(75) Inventors: Mutsumi Katayama, Saitama (JP); Kazumitsu Kushida, Saitama (JP); Yasuo Oishi, Saitama (JP)

(73) Assignees: Honda Giken Kogyo Kabushiki Kaisha, Tokyo (JP); Honda Access Corp., Niiza-shi (JP)

( * ) Notice: Subject to any disclaimer, the term of this patent is extended or adjusted under 35 U.S.C. 154(b) by 768 days.

(21) Appl. No.: 10/356,712

(22) Filed: Feb. 3, 2003

(65) Prior Publication Data

US 2003/0220076 A1 Nov. 27, 2003

(30) Foreign Application Priority Data

Feb. 5, 2002 (JP) ............. P2002-028156
Feb. 21, 2002 (JP) ............. P2002-045131

(51) Int. Cl.
*H04B 1/38* (2006.01)
(52) U.S. Cl. ............. 455/574; 455/91; 455/95; 455/99; 455/102; 455/103; 455/115.2; 455/123; 455/127.1; 455/127.5; 455/130; 455/132; 455/151.2; 455/171.1; 455/181.1; 455/343.5; 455/343.1
(58) Field of Classification Search .......... 455/91, 455/95, 99, 102, 103, 115.2, 123, 130, 127.1, 455/127.5, 132, 151.2, 171.1, 181.1, 343.5, 455/343.1
See application file for complete search history.

(56) References Cited

U.S. PATENT DOCUMENTS

| | | | |
|---|---|---|---|
| 5,554,978 A | | 9/1996 | Sakagami et al. |
| 5,682,379 A | * | 10/1997 | Mahany et al. ............. 370/311 |
| 5,717,386 A | | 2/1998 | Sakagami et al. |
| 6,026,303 A | | 2/2000 | Minamisawa |
| 6,178,323 B1 | | 1/2001 | Nagata |
| 6,366,771 B1 | * | 4/2002 | Angle et al. ............. 455/414.1 |
| 6,604,201 B1 | * | 8/2003 | Takahashi et al. .......... 713/323 |

(Continued)

FOREIGN PATENT DOCUMENTS

DE 198 51 959 A1 5/2000

(Continued)

OTHER PUBLICATIONS

"Specification of the Bluetooth System, wireless connections made easy, Core, version 1.1" Feb. 22, 2001, Specification of the Bluetooth System, XX, XX pp. 1,92-125, XP002223350.

(Continued)

*Primary Examiner*—Duc M. Nguyen
*Assistant Examiner*—Justin Lee
(74) *Attorney, Agent, or Firm*—Westerman, Hattori, Daniels & Adrian, LLP.

(57) ABSTRACT

The present invention provides a radio communication system in which not only a communication unit operating in a slave mode but also a communication unit operating in a master mode can be changed into a power saving mode.

Among a plurality of communication units, one of them is operating in the master mode while the others are operating in the slave mode. Only the communication units operating in the slave mode are allowed to be changed into a suspend state. The communication unit operating in the master mode stops transmission/reception in synchronization with transition into the stop state of the communication units operating in the slave mode.

21 Claims, 10 Drawing Sheets

U.S. PATENT DOCUMENTS

| | | | |
|---|---|---|---|
| 6,807,159 B1 * | 10/2004 | Shorey et al. | 370/318 |
| 6,901,275 B1 * | 5/2005 | Aoyagi | 455/574 |
| 2005/0190739 A1 * | 9/2005 | Sparrell et al. | 370/347 |

FOREIGN PATENT DOCUMENTS

| | | |
|---|---|---|
| EP | 0 615 364 A1 | 9/1994 |
| JP | 62-155535 | 7/1987 |
| JP | 05-236560 | 9/1993 |
| JP | 10-145276 | 5/1998 |
| JP | 10-308697 | 11/1998 |
| JP | 11-146030 | 5/1999 |
| JP | 2001-054169 | 2/2001 |
| JP | 2001-103570 | 4/2001 |
| JP | 2001-103570 A | 4/2001 |
| JP | 2001-148657 | 5/2001 |
| JP | 2001-155534 | 6/2001 |
| WO | WO 01/01717 A1 | 1/2001 |

OTHER PUBLICATIONS

Garg S et al., "Mac Scheduling Policies for Power Optimization in Bluetooth: A Master Driven TDD Wireless System" May 15, 2000, VTC 2000-Spring. 2000 IEEE 51$^{st}$. Vehicular Technology Conference Proceedings. Tokyo, Japan, May 15-18, 2000, IEEE Vehicular Technology Conference, New York, NY: IEEE, US, pp. 196-200, XP000970607.

Prabhu B J et al: "A routing protocol and energy efficient techniques in bluetooth scatternets" Apr. 28, 2002, ICC 2002. 2002 IEEE International Conference on Communications. Conference Proceedings. New York, NY, Apr. 28-May 2, 2002, IEEE International Conference on Communications, New York, NY: IEEE, US, pp. 3336-3340, XP010590087.

Office Action from the Japanese Patent Office dated Aug. 11, 2006 in the corresponding Japanese Patent Application.

Office Action from the Japanese Patent Office dated Nov. 15, 2006 in the corresponding Japanese Patent application.

* cited by examiner

RADIO COMMUNICATION SYSTEM

BACKGROUND OF THE INVENTION

1. Field of the Invention

The present invention relates to a radio communication system in which out of a plurality of communication units which perform radio communication with each other, one operates in a master mode while the others operate in a slave mode, and each of the communication units is operated by a battery.

2. Description of the Related Art

There is disclosed in the microfilm of Japanese Utility Model Application Laid-Open No. S62-155535 a radio communication system in which, in order to allow conversation between riders (driver and passenger) on two-wheeled vehicles, a helmet of each rider is provided with a communication system, that is, intercommunication system, comprising a speaker, a microphone and a communication unit, thereby allowing a direct conversation between the riders. In addition, a technique which utilizes Bluetooth as radio communication standards of the interconnection system is disclosed in the Japanese Patent Application Laid-Open No 2001-155534.

When a radio communication unit is mounted on a helmet of each rider and power source of the communication unit is supplied from the vehicle, a wiring is required so as to connect the vehicle to the helmet of the rider and therefore, a small battery like a dry cell is preferably used as power source. In such a situation, in order to achieve a longer battery operating time, a technique for reducing power consumption of the radio communication unit is of importance.

In the radio communication system, when a time during which communication is not performed exceeds a predetermined time, each communication unit is changed into a power saving mode, called "sleep mode" or "standby mode".

According to Bluetooth standards, among a plurality of communication units, one communication unit functions as a master and the others as slaves, which consist in a Personal Area Network called "piconet". Also in this piconet, a power saving mode called "Sniff mode" is prepared.

In a normal mode other than Sniff mode, each slave is required to prepare for receiving from the master in all time slots on the ACL (Asynchronous Connection-Less) link. In the Sniffmode, as shown in FIG. 16, times lots (Sniffslots) specified at predetermined intervals called Sniff period (Tsniff) are prepared and packet transmission/reception is limited in these Sniff slots.

Slaves are allowed to keep in synchronization in piconet, even if they are in the Sniff mode, and have their own address information (BD_ADDR). When each slave receives a packet in a Sniff slot, it refers to an AM_ADDR registered in a packet header. When the packet is addressed to this slave, it continues to receive the packet. When the packet is not addressed to this slave, it stops receiving the packet to prepare for next Sniff slot. The above-mentioned Sniff slot does not have to be a single time slot (625μ second), but may be plural time slots (Nsniffattempt) as shown in FIG. 17.

Thus, since the communication units in the slave mode do not have to receive packets with all reception slots in the Sniff mode, it is possible to reduce power consumption. However, the master can not be changed into the Sniff mode. For this reason, only a battery of the communication unit operating in the master mode is likely to be exhausted earlier than batteries of the other communication units operating in the slave mode. If the master is rendered inoperable by lack in the remaining battery life, the slaves become incapable of communicating irrespective of the remaining battery life.

SUMMARY OF THE INVENTION

It is a first object of the present invention to provide a radio communication system in which not only a communication unit operating in a slave mode but also a communication unit operating in a master mode are allowed to be changed into a power saving mode.

It is a second object of the present invention to provide a radio communication system in which operation modes to be assigned to each of a plurality of communication units which consist in a network are switched between a master mode and a slave mode automatically in such a manner that remaining battery life are equalized among the communication units.

In other to achieve the above-mentioned objects, the present invention provides a radio communication system including a plurality of communication units consisting in a radio network, one of the plurality of communication units operating in a master mode, the others operating in a slave mode, and transition into a suspend state being allowed during operation in the slave mode, with means as follows:

(1) A communication unit operating in the master mode stops transmission/reception operations in synchronization with the transition into the suspend state of communication units operating in the slave mode.

(2) The radio network consists in an intercommunication system.

(3) The radio network is configured by Bluetooth.

(4) The communication units operating in the slave mode are all changed into the suspend state substantially in tandem with each other.

(5) Sniff periods of the communication units operating in the slave mode are substantially in synchronization and in phase with each other.

(6) Sniff periods of the communication units operating in the slave mode are substantially in synchronization with each other and out of phase.

(7) Sniff periods of the communication units operating in the slave mode are sequential.

(8) The master mode and the slave mode are switched so as to equalize remaining battery life of the communication units.

(9) Each of the communication units comprises means for calculating an operation maintaining time in operating in the master mode in which when the operation maintaining time exceeds a predetermined time, the master mode and the slave mode are switched between the communication unit operating in the master mode.

(10) Each of the communication units comprises a battery as driving power, means for calculating an operation maintaining estimated time in an actual operation mode, and means for exchanging information on the operation maintaining estimated time with other communication units, in which the master mode and the slave mode are switched in such a manner that a communication unit of which the operation maintaining estimated times are longer operates in the master mode while communication units of which the operation maintaining estimated times are shorter operate in the slave mode.

(11) Each of the communication units comprises means for calculating a own cumulative time of operating in a power saving mode and means for exchanging information on the cumulative time with other communication units, in which the master mode and the slave mode are switched in such a manner that a communication unit of which the cumulative time is longer operates in the master mode while communication units of which the cumulative times are shorter operate in the slave mode.

According to the above-mentioned feature (1), not only a communication unit operating in the slave mode but also a communication unit operating in the master mode can be changed into a suspend state without loss of convenience of the network.

According to the above-mentioned feature (2), it is possible to prevent a communication unit operating in the master mode from sharp decreasing of the battery remaining life, thereby assuring longer battery operating times in the whole intercommunication system.

According to the above-mentioned feature (3), it is possible to lengthen a battery operating time of each communication unit irrespective of its operation mode in a general-purpose communication system.

According to the above-mentioned feature (4), it is possible to prevent a battery operating time or only a part of a plurality of slaves from being shortened.

According to the above-mentioned feature (5), Sniff slots of slaves are substantially identical to each other, thereby allowing an operation time of the master to be shortened.

According to the above-mentioned feature (6), while the master is in communication with a slave, the other slaves can be in a suspend state, thereby allowing the whole length of Sniff slots corresponding to an operation time for the slaves to be shortened.

According to the above-mentioned feature (7), it is possible to reduce the number of starting-up of the master from a suspend state, thereby allowing further decrease in power consumption of the master.

According to the above-mentioned feature (8), it is possible to present only a part of communication units from uneven decreasing in battery.

According to the above-mentioned feature (9), since operation modes of the respective communication units can be switched at predetermined intervals, an operating time as a master can be provided evenly among the respective communication units. Therefore, it is possible to prevent only a part of the communication units from continuously operating as a master which leads to excessive reduction in its remaining battery life.

According to the above-mentioned feature (10), an operation maintaining estimated time during which an actual operation mode (master or slave) is maintained is measured for each of the communication units, and a communication unit of which the operation maintaining estimated time is the longest is to operate in the master mode. Accordingly, even if power consumption of the operation mode is different in the communication units, it is possible to assign the master mode to an appropriate communication unit.

According to the above-mentioned feature (11), a cumulative time of operating in the power saving mode is determined in each of the communication units and the master mode is assigned to a communication unit with the longest cumulative time, that is, communication unit which is expected to have the maximal remaining battery life. Therefore, it is possible to present a situation that a battery of only a part of communication units is decreased.

DETAILED DESCRIPTION OF THE PREFERRED EMBODIMENTS

Figure 1:
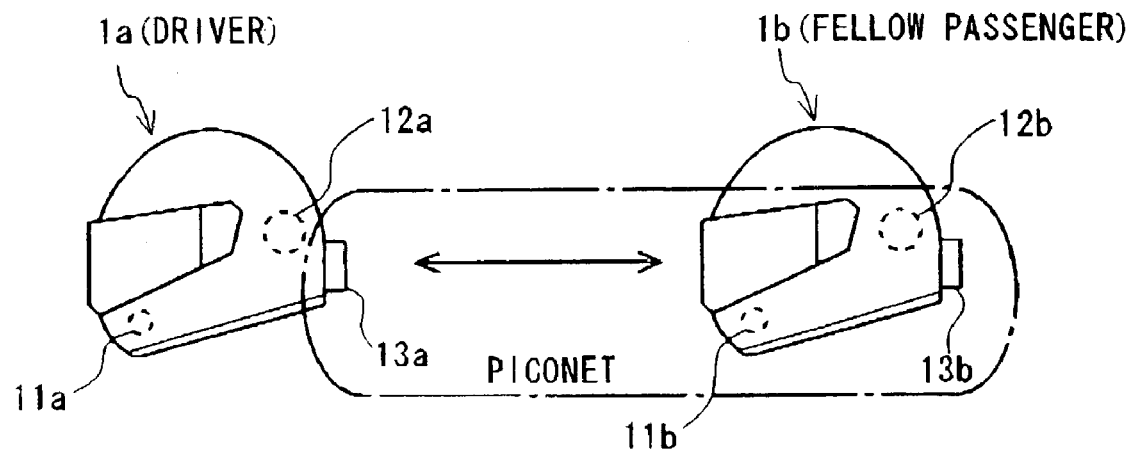
FIG. 1 is a view in schematic form depicting a minimal configuration of a vehicle radio communication system to which the present invention applies.

Preferred embodiments of the present invention will be described in detail with reference to the drawings. FIG. 1 is a view in schematic form depicting a minimal configuration of a vehicle radio communication system to which the present invention applies. Helmets 1*a* and 1*b* which a driver and a fellow passenger wear are provided with microphones 11*a* and 11*b*, speakers 12*a* and 12*b* and radio communication units 13*a* and 13*b*, respectively.

The above-mentioned radio communication units 13*a* and 13*b* are in conformity with Bluetooth, and perform radio communication with each other on a piconet which accommodate the units as terminals, in which one operates in a master mode while the other in a slave mode. The radio communication units 13*a* and 13*b* can be changed, when operating in the slave mode, into a power saving mode, called Sniff mode, under predetermined conditions.

Figure 2:
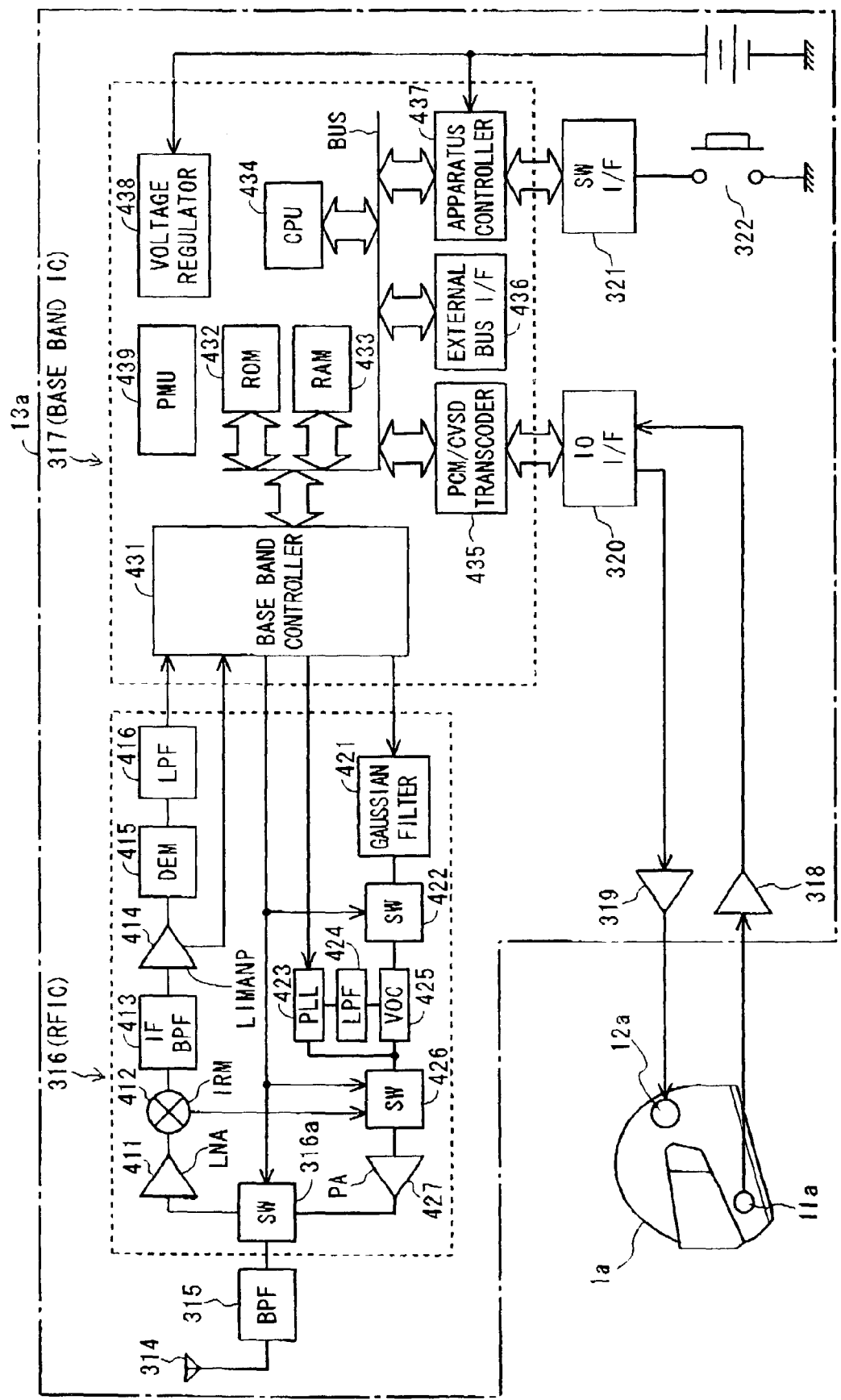
FIG. 2 is a block diagram showing a configuration of a principal part of a communication unit.

FIG. 2 is a block diagram showing a configuration of a principal part of the communication unit 13*a*. Like numerals refer to the same or equivalent sections.

An antenna 314 of the communication unit 13*a* is connected to an RFIC 316 via a band pass filter 315. The RFIC 316 has a reception path and a transmission path switched by an antenna switch 316a. The reception path comprises a low noise amplifier (LNA) 441, a mixer (IRM) 412, an IF band pass filter (IFBPF) 413, a limit amplifier (LIMAMP) 414, a demodulator (DEM) 415 and a low pass filter (LPF) 416. The transmission path comprises a Gaussian filter 421, a switch 422, a PLL circuit 423, an LPF 424, a voltage controlled oscillator (VCO) 425, a switch 426 and a power amplifier (PA) 427.

A base band IC 317 for processing a base band signal comprises a base band controller 431, a ROM 432, a RAM 433, a CPU 434, a PCM/CVSD transcoder 435, an external bus I/F 436, an apparatus controller 437, which are all connected to a bus, a voltage regulator 438 for stabilizing power voltage and a power managing unit (PMU) 439.

A voice picked up by the microphone 11a is amplified at the power amplifier 318 to be input to the IO I/F 320. A received voice signal output from the I/F 320 is amplified by a power amplifier 319 to be reproduced by the speaker 12a. To the switch interface (SWI/F) 321 is connected a main switch 322. The RFIC 316 and the base band IC 317 are well-known circuits and therefore, specific explication of their operations will be omitted.

Figure 3:
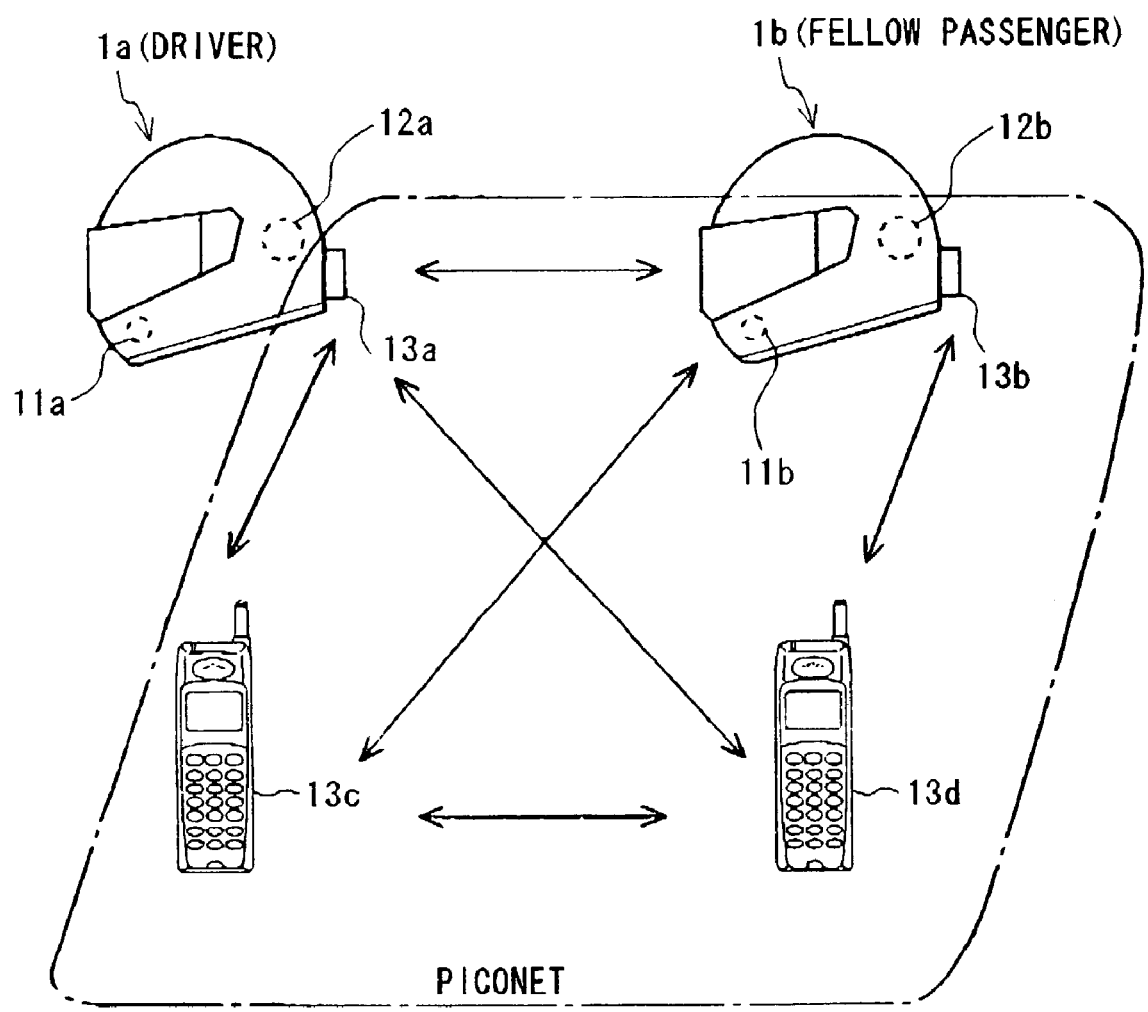
FIG. 3 is a view in schematic form depicting another configuration of the vehicle radio communication system to which the present invention applies.

FIG. 3 is a view in schematic form depicting another configuration of the vehicle radio communication system to which the present invention applies. Like numerals refer to the same or equivalent sections.

In the present embodiment, beside the communication units 13a and 13b provided in the helmets 1a and 1b of the driver and the fellow passenger, mobile phones 13c and 13d which the driver and the fellow passenger possess also comprise a communication function in conformity with Bluetooth standards. The radio communication units 13a and 13b and the mobile phones 13a and 13d consist in the piconet, in which one of them operates in a master mode, the others in a slave mode while they are radio communicating with each other. Also, in the present embodiment, each of the communication units (Also the mobile phones. Same is applied hereinafter) can be changed into the above-mentioned Sniff mode under the predetermined conditions when they are operating in the slave mode.

Figure 4:
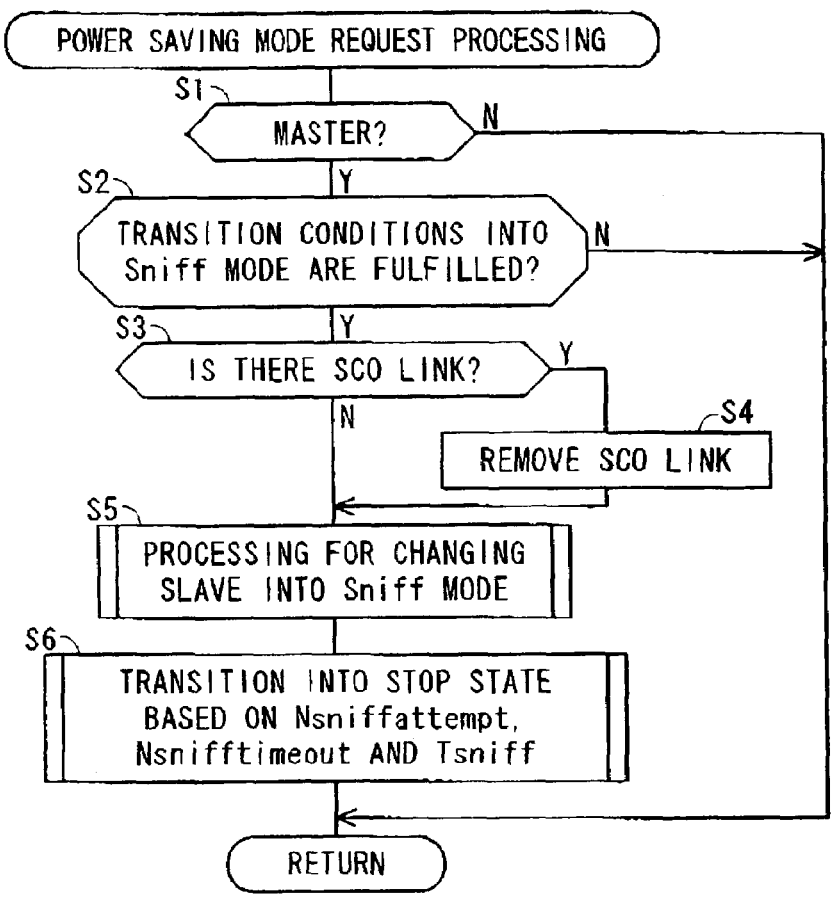
FIG. 4 is a flowchart showing an operation of power saving mode request processing.

FIG. 4 is a flowchart showing an operation of power saving mode request processing for requesting from the master, that each slave is changed into the Sniff mode under the predetermined conditions. This processing is executed repeatedly at given intervals in each of the communication units. Here, description is made about a case where, in the communication pattern described with reference to FIG. 3 (four communication units), the communication unit 13a operates in the master mode while the communication unit 13b and mobile phones 13c and 13d operate in the slave mode.

In a step S1, it is determined whether an actual operation mode is the master mode or the slave mode. If it is the master mode, the operation proceeds to a step S2, or if it is the slave mode, this processing is terminated. Accordingly, for the communication unit 13b and mobile phones 13c and 13d, this processing is terminated.

For the communication unit 13a in the master mode, the processing proceeds to the step S2, where it is determined whether transition conditions in the Sniff mode are established. In the present embodiment, if a state where other communication than polling is not carried out continues for more than a predetermined time, the aforementioned transition conditions are determined as established, and then, the processing proceeds to a step S3.

In the step S3, presence or absence of an SCO (Synchronous Connection-Oriented) link for transmitting and receiving real-time data packets such as a voice, one for one is determined. When the SCO link is detected, an SOC link removing request (LMP_remove_soc_link_req) is transmitted to remove the SOC link in the step S4. In a step S5, the processing for changing each of the slaves into the Sniff mode is carried out.

Figure 5:
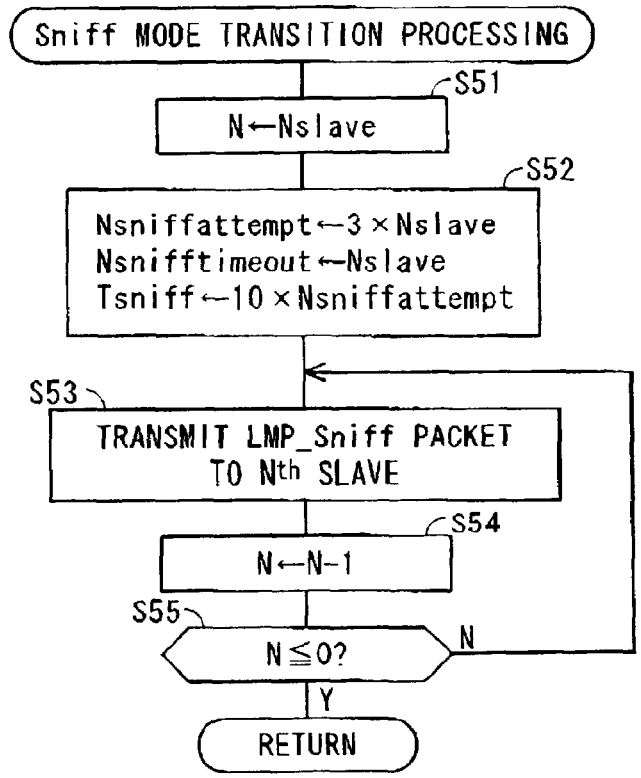
FIG. 5 is a flowchart for showing an operation of Sniff mode transition processing.

FIG. 5 is a flowchart for showing an operation of the Sniff mode transition processing to be executed in the step S5.

In a step S51, the number of slaves Nslave consisting the piconet at the present time is substituted into a variant N. In this embodiment, since three communication units 13b, 13c and 13d operate in the slave mode, "3" is substituted into the variant N.

In a step S52, three-times the number of slaves Nslave ("9" in this embodiment) is set as the number of Sniff slots Nsniffattempt. This is because one slave reserves (1) slot for the master polling a slave, (2) slot for the slave responding to the polling and (3) spare slot for the master transmitting other data than polling to the slave.

Further, even after transmission of packets from the master ceases, the number of slaves Nslave is set as the number of slots for the slaves continuing reception (the number of reception continuing slots Nsnifftimeout) Further, ten-times the number of Sniff slots (Nsniffattempt) is set as a period for executing transmission/reception with a Sniff slot, stopping transmission/reception and then restarting transmission/reception (Sniff period Tsniff).

Figure 6:
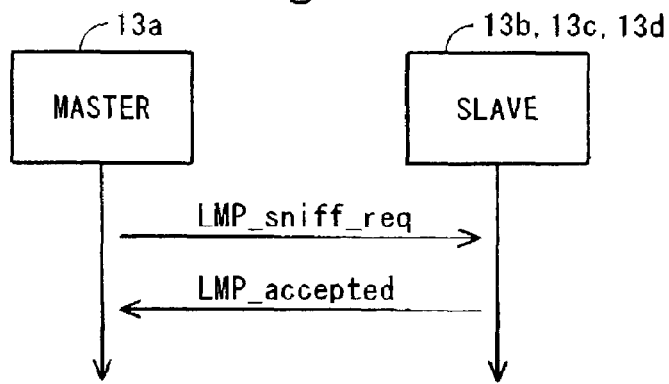
FIG. 6 is a flowchart for showing a communication protocol of Sniff mode transition request and a response thereto.

In a step S53, the above-mentioned number of Sniff slots Nsniffattempt, number of reception continuing slots Nsnifftimeout and Sniff period Tsniff as well as a Sniff mode transition request packet (LMP_Sniff_req) are transferred to a first slave (N=3) as shown in FIG. 6. In response to this, the slave transmits a control packet (LMP_accepted). In a step S54, the aforementioned variant N is decremented. In a step S55, it is determined whether the variant N reaches zero or not. If not, the processing of the steps S53 to S55 is repeated until the variant N reaches zero. Thus, transition into the Sniff mode becomes accepted by all the slaves.

With reference back to FIG. 4, when the Sniff mode transition request is established for all of the slaves 13b, 13c and 13d, in a step S6, the master 13a is changed into the stop mode in synchronization with the slaves based on the number of Sniff slots Nsniffattempt, the number of reception continuing slots Nsnifftimeout and the Sniff period Tsniff of which the master 13a informs the slaves. Return from the Sniff mode to a normal state can be requested by either of the master and slaves in conformity with the Bluetooth standards.

Figure 7:
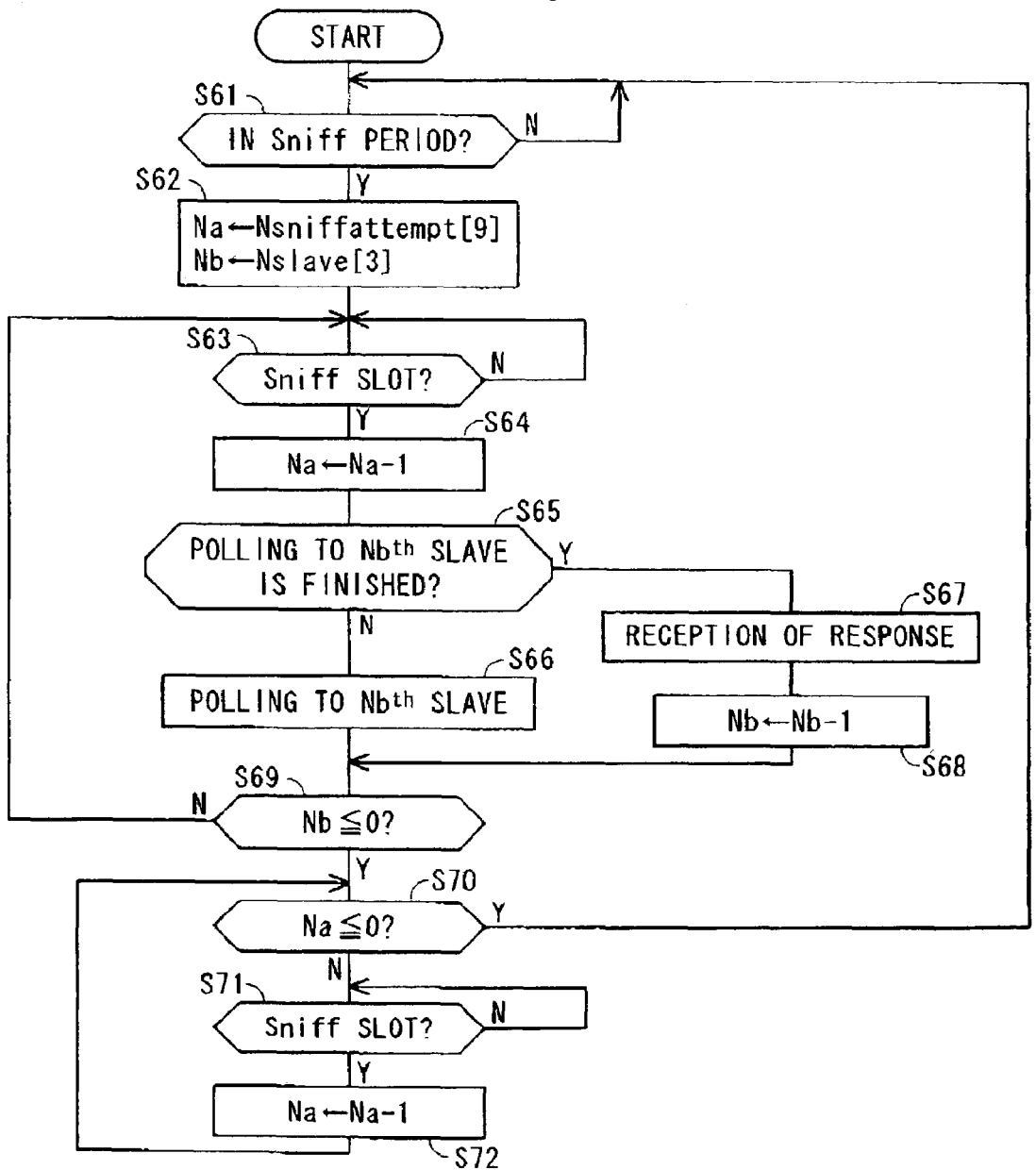
FIG. 7 is a flowchart for showing an operation of the master in a suspend state.
Figure 8:
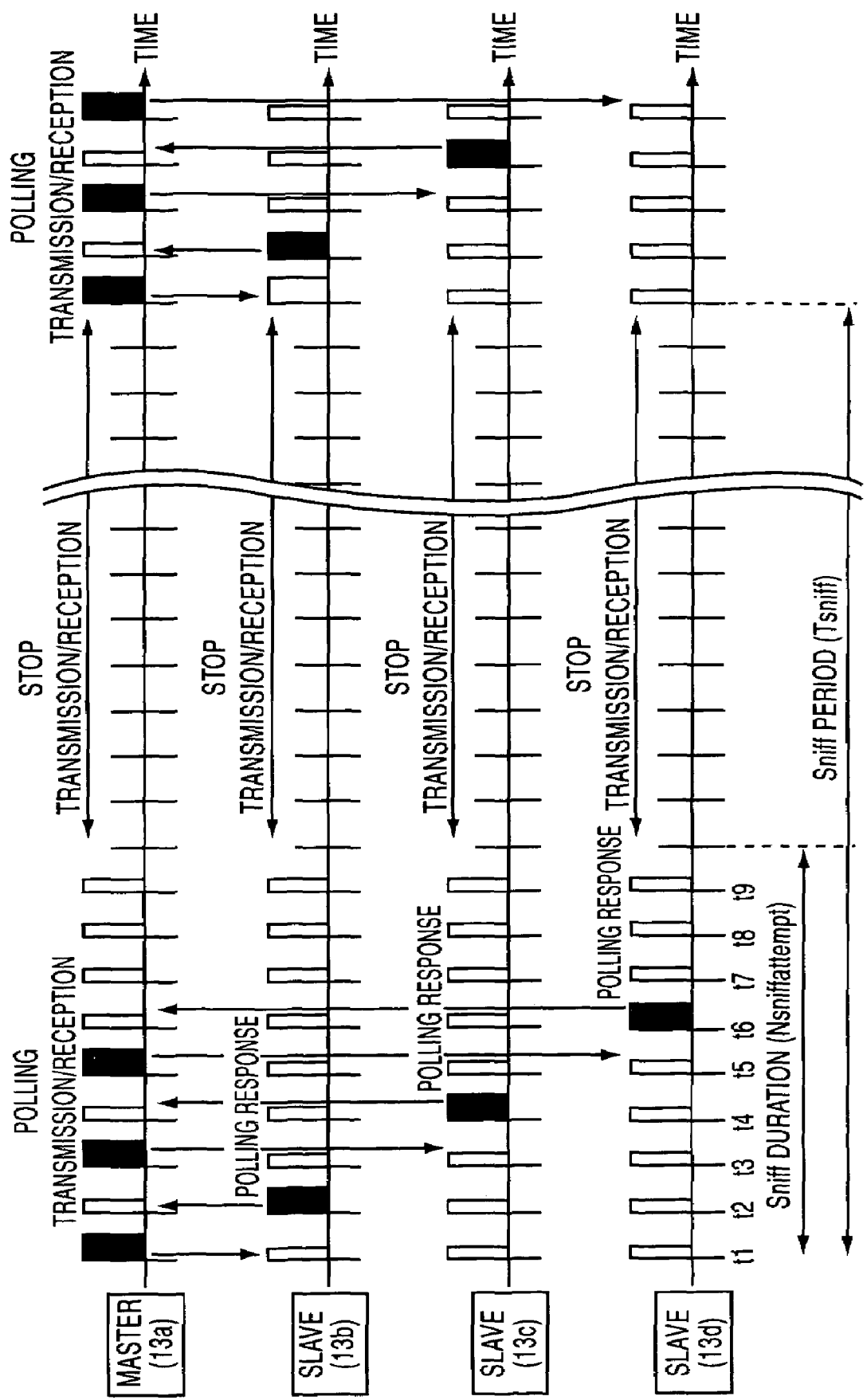
FIG. 8 is a timing diagram showing an operation of the master in a suspend state.

FIG. 7 is a flowchart showing an operation of the master in the suspend state, and FIG. 8 is a timing chart thereof.

The Sniff period starts at the time t1 in FIG. 8. When this starting of the Sniff period is detected in a step S61 in FIG. 7, the number of Sniff slots Nsniffattempt ("9" in the present embodiment) is substituted into a variant Na which represents for the number of left unattended slots in a step S62, while the number of slaves Nslave ("3" in the present embodiment) is substituted into a variant Nb which represents for the number of left unattended slaves. In a step S63, it is determined whether it is a Sniff slot or not. Here, since it is determined as a first Sniff slot, the operation proceeds to a step S64. In the step S64, the variant Na which represents for the number of left unattended slots is decremented.

In a step S65, it is determined whether polling is finished or not for the $Nb^{th}$ slave. Since it is determined as not finished in this embodiment, it proceeds to a step S66. In the step S66, the $Nb^{th}$ slave (in the present embodiment, communication unit 13b which is the third slave) is subjected to polling. In a step S69, it is determined whether or not the variant Nb is 0 or less. Here in this embodiment, since it is determined that it is not 0 or less, the operation goes back to the step S63.

When the second Sniff slot is detected at the time t2 (in the step S63), it is determined in the step S65 that polling is finished, and the operation proceeds to a step S67, and then, a response signal transmitted from the actually $Nb^{th}$ or third slave is received. In a step S68, the variant Nb which represents for the number of left unattended slots is decremented. In the step S69, it is determined whether or not the variant Nb is 0 or less. Here in this embodiment, since it is determined that the variant Nb is not 0 or less, the operation goes back to the step S63.

In the same way, when the third Sniff slot is detected at the time t3 (in the step S63), it is determined that polling is not finished for the $Nb^{th}$ (second) slave in the step S65, the operation proceeds to the step S66, and then, the second slave is subjected to polling. When the fourth Sniff slot is detected at the time t4 (in the step S63), it is determined in the step S65 that polling is not finished for the $Nb^{th}$ slave, the operation proceeds to a step S67, and then, a response signal transmitted from the second slave is received. In a step S68, the variant Nb is decremented. In the step S69, it is determined whether or not the variant Nb is 0 or less. Here in this embodiment, since it is determined that it is not 0 or less, the operation goes back to the step S63.

When the fifth Sniff slot is detected at the time t5 (in the step S63), it is determined that polling is not finished for the $Nb^{th}$ (first) slave in the step S65, the operation proceeds to the step S66, and then, the $Nb^{th}$ slave is subjected to polling. When the sixth Sniff slot is detected at the time t6 (in the step S63), it is determined in the step S65 that polling is finished for the $Nb^{th}$ slave, the operation proceeds to a step S67, and then, a response signal transmitted from the $Nb^{th}$ slave is received. In a step S68, the variant Nb is decremented. In the step S69, it is determined that the variant Nb is 0 or less and the operation proceeds to a step S70.

In the step S70, it is determined whether or not the variant Na (the number of left unattended slots) is 0 or less. Here in this embodiment, since it is more than 0, the operation proceeds to a step S71. When the seventh Sniff slot is detected at the time t7 (in the step S71), then in a step S72, the variant Na is decremented.

In the same manner, once the eighth and ninth Sniff slots are detected at the times t8 and t9, respectively, the variant Na is decremented per slot in the step S72. Then, in the step S70, it is determined that the variants Na is 0 or less, that is, the processing is completed for this time of Sniff slots, and it returns to the step S61, in which transmission/reception operations are stopped until next Sniff slots. Namely, the master is in the suspend state before a next Sniff period starts.

According to the present invention, not only a communication unit operating in the slave mode but also a communication unit operating in the master mode can be changed into a stop state. Therefore, in a radio communication system in which the communication units are battery-operated, it is possible to prevent sharp decrease of the battery from occurring only in a communication unit operating in the master mode, thereby assuring longer battery operating times in the whole communication system.

Figure 9:
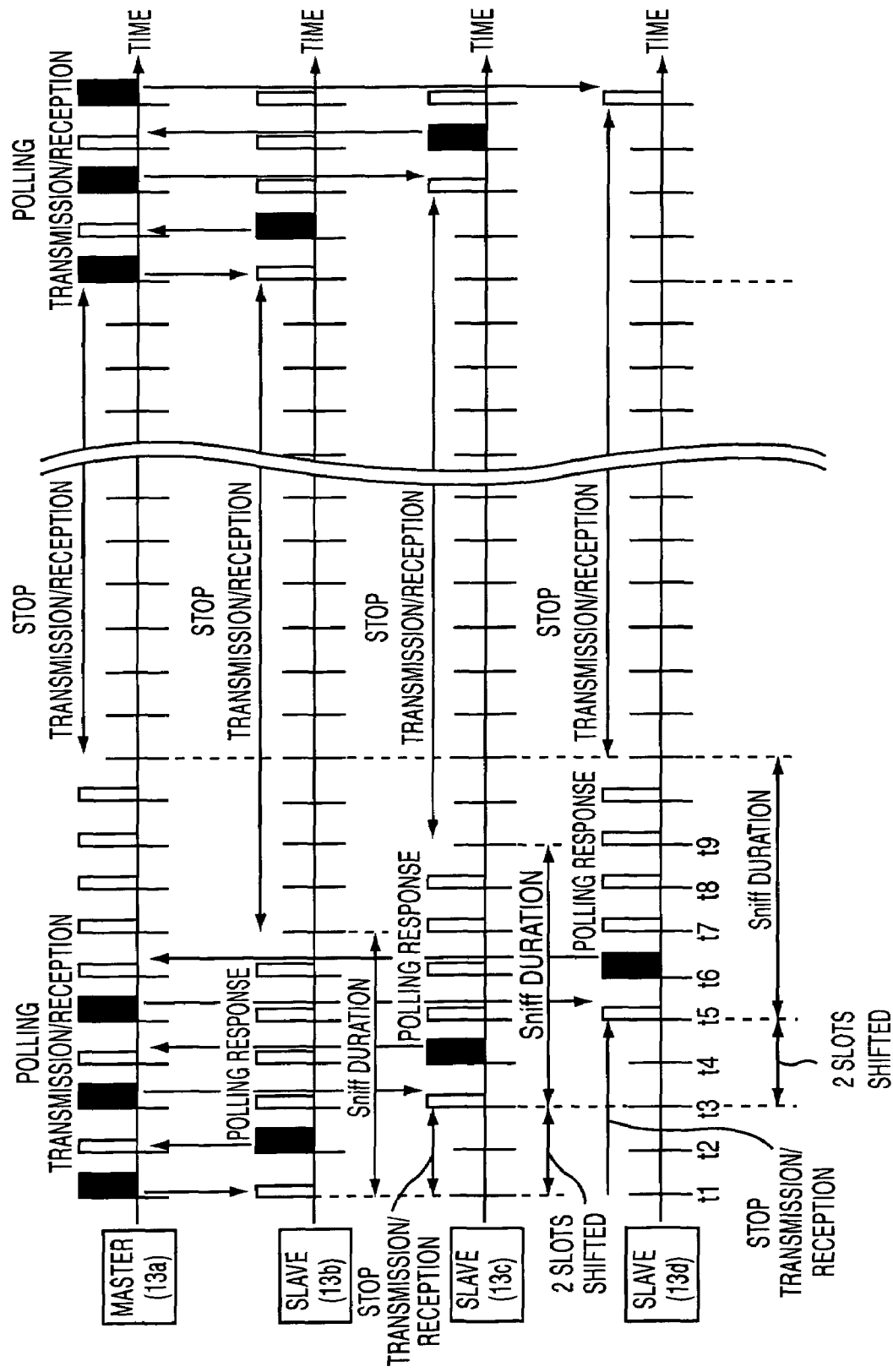
FIG. 9 is a timing diagram showing an operation of the master in the suspend state according to another embodiment.

FIG. 9 is a timing diagram showing operational timing of a second embodiment of the present invention. In the above-described first embodiment, it is described that the communication units 13b, 13c and 13d operating in the slave mode are brought into the suspend state in same synchronization and in phase with each other. On the other hand, in this embodiment, the communication units 13b, 13c and 13d operating in the slave mode are brought into the suspend state in same synchronization with each other but out of phase by several slots. Further, in the present embodiment, the number of Sniff slots Nsniffattempt is decreased to twice the number of slaves.

In the present embodiment, for example, a time at which each slave is brought into a suspend state is shifted by two slots. Then, while the master executes polling to the slave 13b and receives a response signal from the slave 13b, the slave 13c is allowed to be in the suspend state, thereby assuring a longer stop time for each slave than that in the first embodiment.

According to the above-described embodiments, a battery operating time of a communication unit which operates in the master mode can be made longer than that in the conventional way. However, the master consumes more power than other communication units which operate in the slave mode since the number of transmission/reception times of the packet is relatively more in the master. Then, in third to sixth embodiments as described below, communication units change operation modes with each other so that the remaining battery life of the respective communication units can be reduced equally among the communication units.

Figure 10:
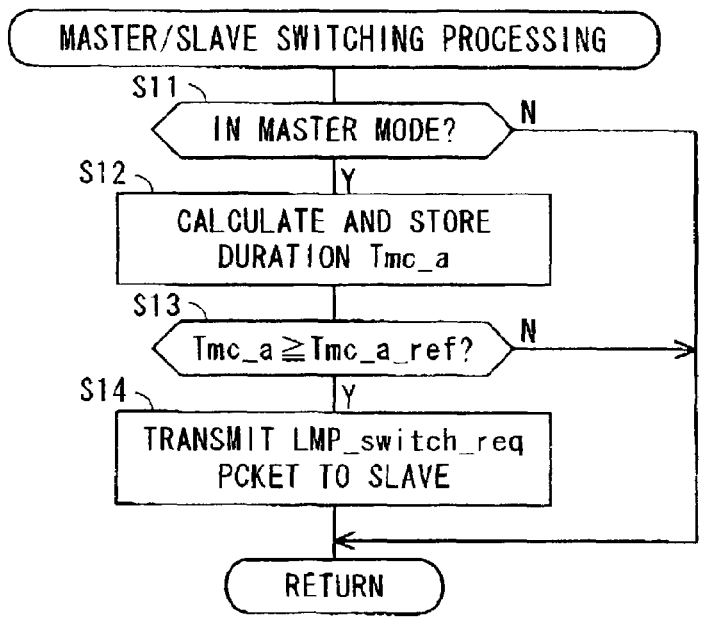
FIG. 10 is a flowchart showing a third embodiment of the present invention.

FIG. 10 is a flowchart showing an operation of a third embodiment of the present invention, in which an operation mode switching procedure (first) is performed at each of the communication units repeatedly at given intervals. Here, description is to be made about a case where, in the communication pattern described with reference to FIG. 1 (two communication units), the communication unit 13a operates in the master mode while the communication unit 13b operates in the slave mode.

In the step S11, it is determined whether an actual operation mode is the master mode or the slave mode. If it is the master mode (that is, communication unit 13a), the processing proceeds to a step S12. On the other hand, if it is the slave mode (that is, communication unit 13b), this processing is terminated. In the step S12, a duration Tmc_a from the communication unit 13a starting operation in the master mode now on is determined.

In a step S13, the duration Tmc_a of the master 13a is compared with a reference duration Tmc_a_ref. When the duration Tmc_a is shorter than the reference duration Tmc_a_ref, this processing is terminated to continue operation in the master mode. When the duration Tmc_a is equal to or longer than the reference duration Tmc_a_ref, the processing proceeds to a step S14. In the step S14, a master/slave switching request packet (LMP_switch_req) is transmitted to the communication unit 13b which is operating in the slave mode.

Figure 11:
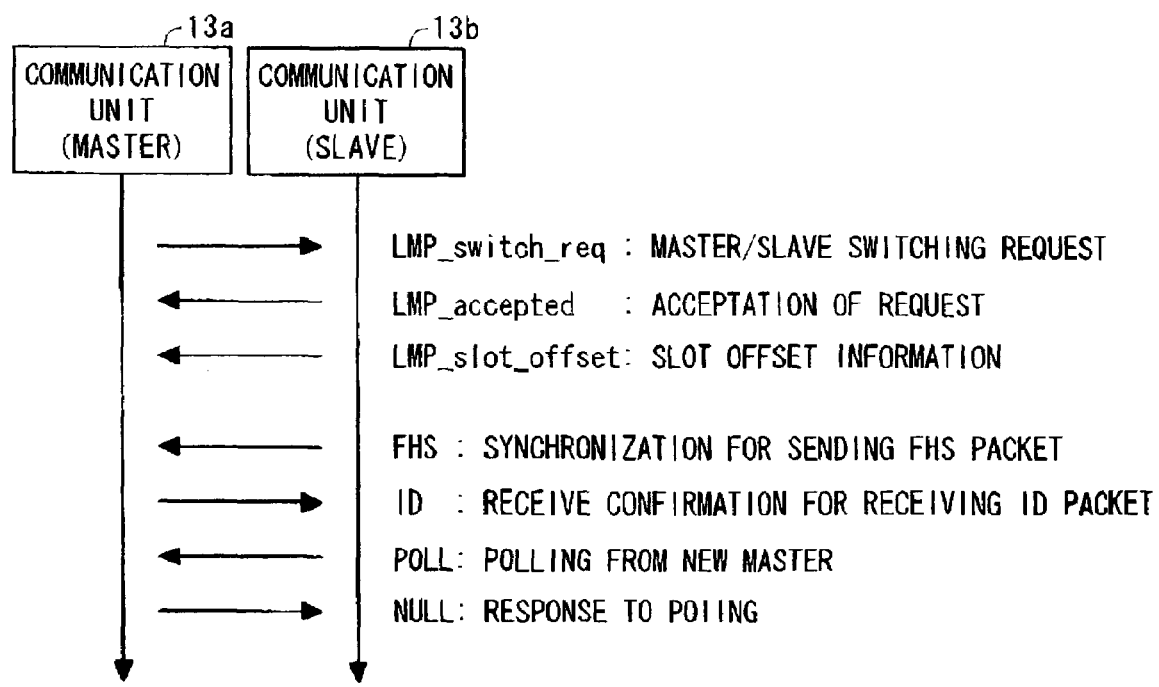
FIG. 11 is a view showing an example of a communication sequence to be executed by communication units between which master/slave is switched.

FIG. 11 is a communication sequence showing the procedure for switching operation modes between the master and the slave in response to the master/slave switching request packet (LMP_switch_req) transmitted from the master as described above.

The communication unit 13b in the slave mode transmits, in response to the master/slave switching request (LMP_switch_req), a request accepted packet (LMP_accepted) for confirming that the switching requested is accepted, and further, transmits a slot offset information (LMP_slot_offset) packet for establishing synchronization within the piconet and a FHS packet (establishment of synchronization by the FHS packet). The communication unit 13a in the master mode transmits, in response to these, an ID packet of itself for reception acknowledgement. Later, a POLL (Polling) packet is transmitted from the communication unit 13b which is next to operate in the master mode, while the communication unit 13a which is next to operate in the slave mode transmits a NULL packet in reply to this.

Here, in the third embodiment described above, it is described that the communication unit 13a operating in the master mode calculates its duration. Otherwise, the communication unit 13b which operates in the slave mode calculates it duration, and when the duration exceeds the reference duration, the communication unit 13b transmits the aforementioned master/slave switching request (LMP_switch_req) to the communication unit which operates in the master mode.

Figure 12:
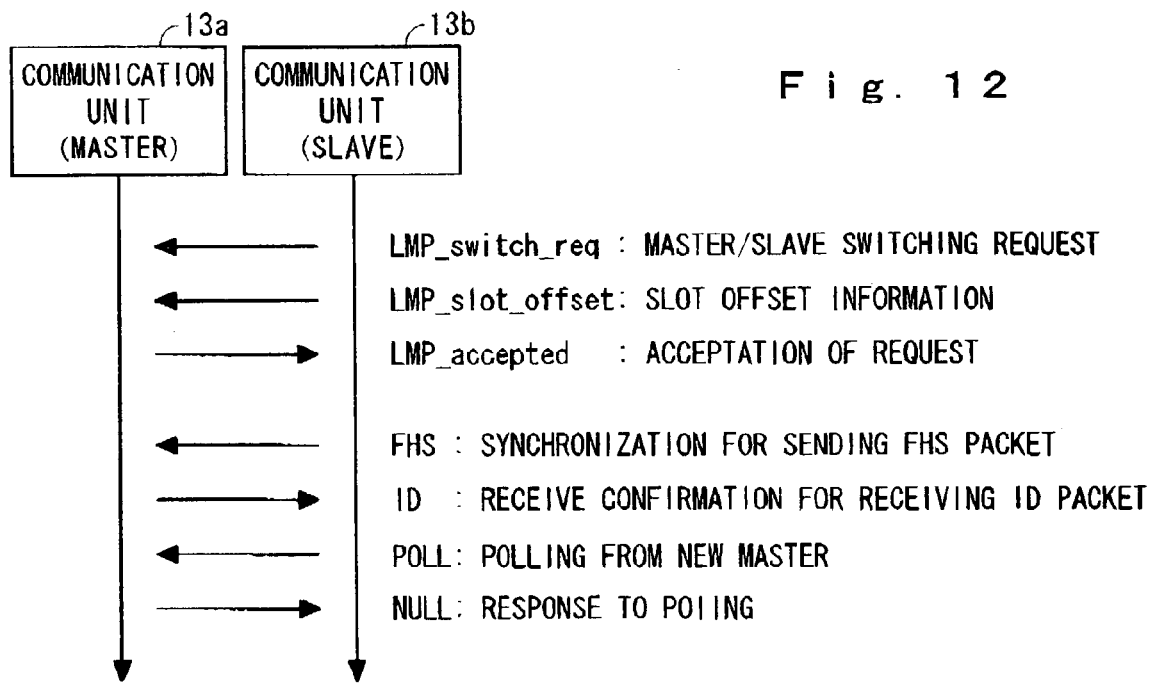
FIG. 12 is a view showing another example of a communication sequence to be executed by communication units between which master/slave is switched.

FIG. 12 is a communication sequence showing the procedure for switching operation modes between the master and the slave in response to the master/slave switching request (LMP_switch_req) transmitted from the slave.

According to the third embodiment, since operation modes of the respective communication units can be switched at predetermined intervals, an operating time as master can be provided evenly to the communication units. Therefore, it is possible to present unevenness decrease in battery such that a battery of only a part of communication units is decreased.

Figure 13:
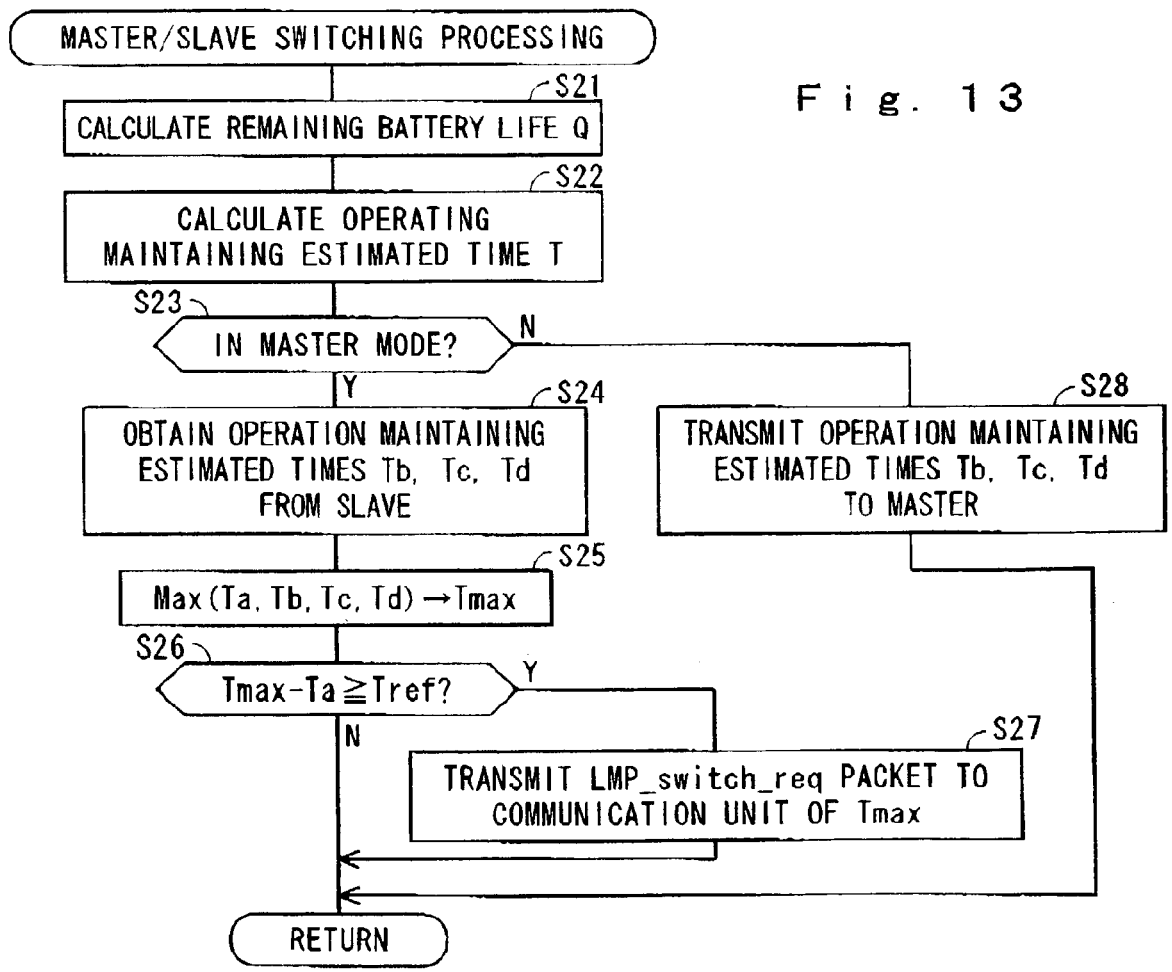
FIG. 13 is a flowchart showing a fourth embodiment of the present invention.

FIG. 13 is a flowchart showing an operation of a fourth embodiment of the present invention in which an operation mode switching procedure (second) is performed at each of the communication units repeatedly at given intervals. Here, description is to be made about a case where, in the communication pattern described with reference to FIG. 3 (four communication units), the communication unit 13a operates in the master mode while the communication unit 13b and mobile phones 13c and 13d operate in the slave mode.

In a step S21, the communication units 13a and 13b and the mobile phones 13c and 13d determine respective remaining battery life Q (Qa, Qb, Qc, Qd) based on terminal voltages and charge/discharge records. When the batteries are lithium ion batteries, the remaining battery life can be determined correctly based on information from power managing means embedded in the lithium ion batteries.

In a step S22, a time during which normal operation can be assured while the current operation mode (master or slave) is maintained, that is, an operation maintaining estimated time is calculated based on its own remaining battery life Q and the operation mode. This operation maintaining estimated time can be determined, for example, for the communication unit 13a operating in the master mode, by dividing the remaining battery life Q by average power consumption in operating in the master mode.

In a step S23, it is determined whether the actual operation mode is the master mode or the slave mode, and when it is the master mode, the processing proceeds to a step S24 and when it is the slave mode, the processing proceeds to a step S28. Accordingly, for the communication unit 13b and mobile phones 13c and 13d, the processing proceeds to the step S28, operation maintaining estimated times T (Tb, Tc, Td) obtained in the above-described step S22 are transmitted to the communication unit 13a in operation in the master mode.

For the communication unit 13a in the master mode, the processing proceeds to the step S24, and the communication unit 13a obtains the operation maintaining estimated times T (Tb, Tc, Td) from the other communication units (13b, 13c, 13d) operating in the slave mode over the piconet to which the communication unit 13a belongs.

In a step S25, the communication unit 13a selects the longest one among the operation maintaining estimated time Ta of itself in the master mode and the operation maintaining estimated times Tb, Tc, Td received from the other communication units 13b, 13c and 13d operating in the slave mode to register the selected one as the maximal maintaining estimated time Tmax. In the present embodiment, description is given below about the case where the operation maintaining estimated time Tb of the communication unit 13b is the longest.

In the step S26, a difference between the maximal maintaining estimated time Tmax (=Tb) and the operation maintaining estimated time Ta of the communication unit 13a is compared with a switching determining time Tref.

When the aforementioned difference is smaller than the determining time Tref, this processing is terminated. On the other hand, when the difference is larger than the determining time Tref, this processing proceeds to a step S27. In the step S27 in order that the master itself is changed into the slave mode and a communication unit (communication terminal 13b in the present embodiment) of which the above-mentioned operation maintaining estimated time T is the longest (Tmax) is brought into the master mode, a master/slave switching request packet (LMP_switch_req) is transmitted to the communication unit 13b.

Then, the communication sequence as described with reference to FIG. 11 is executed, resulting that the communication unit 13a which has been operating in the master mode is changed into the slave mode while the communication unit 13b which has been operating in the slave mode is changed into the master mode.

According to the fourth embodiment, an operation maintaining estimated time when an actual operation mode is maintained is determined for each of the communication units, and a master mode is assigned to a communication unit of which the operation maintaining estimated time is the longest. Therefore, even if power consumption in each operation mode is different in the communication units, it is possible to assign the master mode to an appropriate communication unit.

Here in the above-described fourth embodiment it has been described that an operation maintaining estimated time is determined based on a remaining battery life Q and a communication unit with the longest operation maintaining estimated time is made to operate as a master. However, a communication unit of which the remaining battery life Q is maximal may be made to operate as a master. In this case, if the batteries to be used are lithium ion batteries, the remaining battery life can be determined correctly based on information from power managing means embedded in the lithium ion batteries, thereby allowing accurate judgement by a simple configuration.

Figure 14:
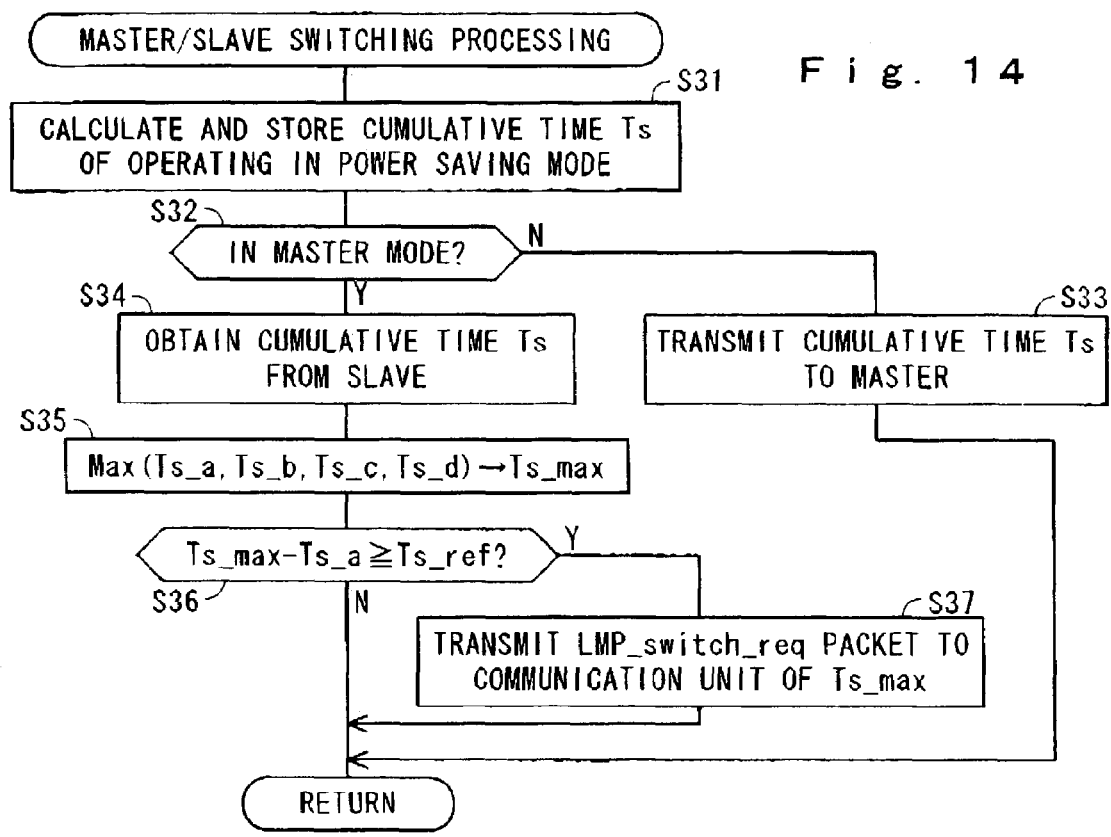
FIG. 14 is a flowchart showing a fifth embodiment of the present invention.

FIG. 14 is a flowchart showing an operation of a fifth embodiment of the present invention in which an operation mode switching procedure (third) is performed at each of the communication units repeatedly at given intervals. Here, description is to be made about a case where, in the communication pattern described with reference to FIG. 3 (four communication units), the communication unit 13a operates in the master mode while the communication unit 13b and mobile phones 13c and 13d operate in the slave mode.

In a step S31, cumulative times Ts (Ts_a, Ts_b, Ts_c, Ts_d) during which communication units 13a and 13b and mobile phones 13c and 13d are operating in the power-saving mode are determined. In a step S32, it is determined whether the current operation mode is the master mode or the slave mode. When the operation mode is the master one, the processing proceeds to a step S34, and on the other hand, when the operation mode is the slave one, the processing proceeds to a step S33. Accordingly, for the communication unit 13b and mobile phones 13c and 13d, it proceeds to the step S33, and the cumulative times Ts (Ts_b, Ts_c, Ts_d) obtained in the step S31 are sent to the communication unit 13a operating in the master mode.

For the case of a communication unit 13a in the master mode, the processing proceeds to the step S34 and obtains the cumulative times Ts (Ts_b, Ts_c, Ts_d) from the other communication units (13b, 13c, 13d) operating in the slave mode over the piconet to which the communication unit 13a belongs.

In a step S35, the communication unit 13a operating in the master mode selects the longest one among the cumulative time Ts_a of itself and the cumulative times Ts_b, Ts_c, Ts_d received from the other communication units 13b, 13c and 13d operating in the slave mode to register the selected one as the maximal cumulative time Tmax. In the present embodiment, description is given below about the case where the cumulative time Ts_b of the communication unit 13b is the longest. In the step S36, it is determined whether or not a difference between the maximal cumulative time Tmax (=Ts_b) and the cumulative time Ts_a of the communication unit 13a is a reference time Ts_ref or longer.

When the aforementioned difference is smaller than the reference time Ts_ref, this processing is terminated. On the other hand, when the difference is larger than the reference time Ts_ref, this processing proceeds to a step S37. In the step S37, in order that the master itself is changed into the slave mode and a communication unit (communication terminal 13b in the present embodiment) of which the above-mentioned cumulative time Ts is the longest is brought into the master mode, the communication unit 13a transmits a master/slave switching request packet (LMP_switch_req) to the communication unit 13b.

Hereinafter, the communication sequence as described with reference to FIG. 11 is executed, resulting that the communication unit 13a which has been operating in the master mode is changed into the slave mode while the communication unit 13b which has been operating in the slave mode is changed into the master mode.

According to the fifth embodiment, a cumulative time of operating in the power saving mode is determined in each of the communication units and the master mode is assigned to a communication unit with the longest cumulative time, that is, a communication unit of which the remaining battery is expected to be maximum. Therefore, it is possible to prevent uneven battery decrease only for a part of communication units.

Figure 15:
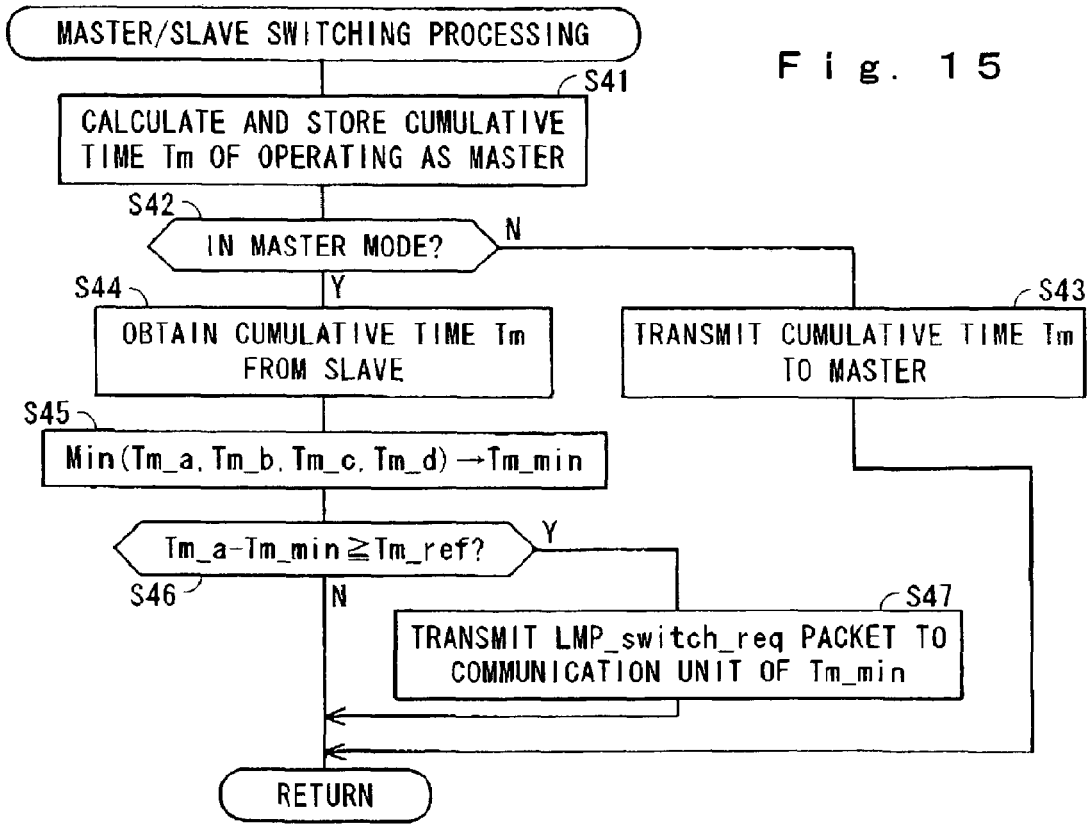
FIG. 15 is a flowchart showing a sixth embodiment of the present invention.
Figure 16:
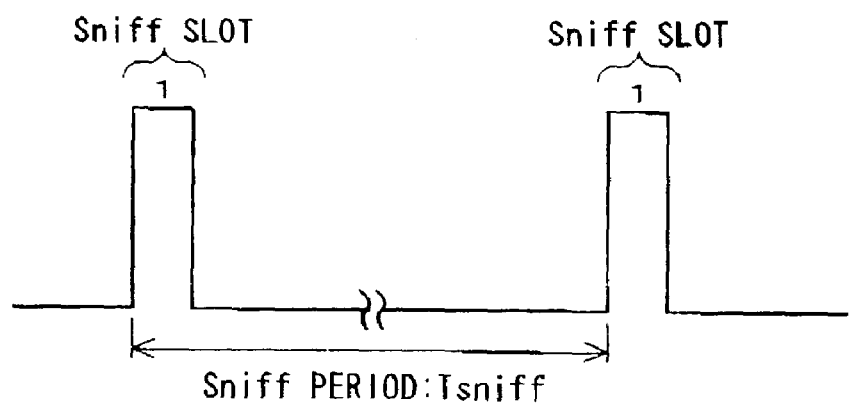
FIG. 16 is an explanation drawing of Sniff slot of Bluetooth.
Figure 17:
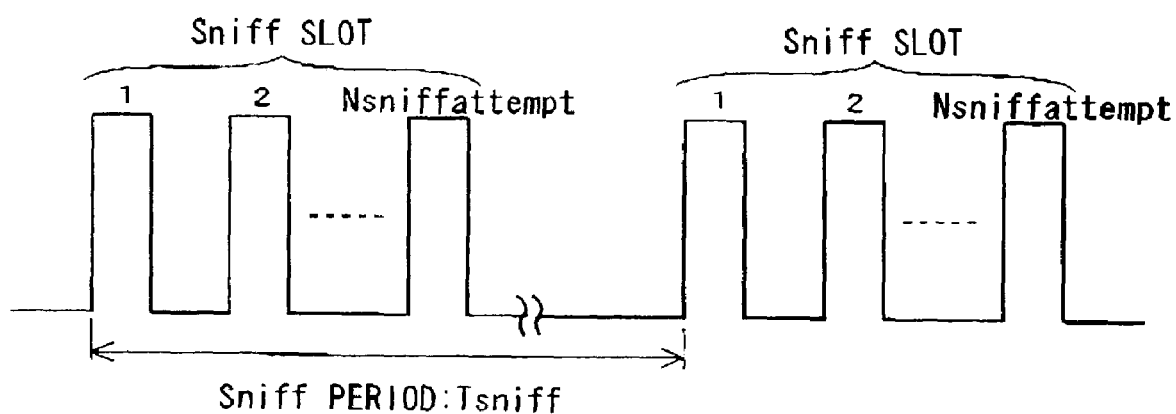
FIG. 17 is an explanation drawing of Sniff slot of Bluetooth.

FIG. 15 is a flowchart showing an operation of a sixth embodiment of the present invention in which an operation mode switching procedure (fourth) is performed at each of the communication units repeatedly at given intervals. Here, description is to be made about a case where, in the communication pattern described with reference to FIG. 3 (four communication units), the communication unit 13a operates in the master mode while the communication unit 13b and mobile phones 13c and 13d operate in the slave mode.

In a step S41, cumulative times Tm (Tm_a, Tm_b, Tm_c, Tm_d) in which communication units 13a and 13b and mobile phones 13c and 13d are operating in the master mode are determined, respectively. In a step S42, it is determined whether the current operation mode is the master mode or the slave mode. When the operation mode is the master one, the processing proceeds to a step S44, and on the other hand, when the operation mode is a slave one, the processing proceeds to a step S43. Accordingly, for the communication unit 13b and mobile phones 13c and 13d, it proceeds to the step S43, and the cumulative times Tm (Tm_b, Tm_c, Tm_d) obtained in the step S41 are sent to the communication unit 13a operating in the master mode.

For the case of a communication unit 13a, the processing proceeds to the step S44 and obtains the cumulative times Tm (Tm_b, Tm_c, Tm_d) from the other communication units (13b, 13c, 13d) operating in the slave mode over the piconet to which the communication unit 13a belongs.

In a step S45, the communication unit 13a operating in the master mode selects the shortest one among the cumulative time Tm_a of itself and cumulative times Tm_b, Tm_c, Tm_d received from the other communication units 13b, 13c and 13d operating in the slave mode to register the selected one as the minimal cumulative time Tm_min. In the present embodiment, description is given below about the case where the cumulative times Tm_c of the communication unit 13c is the shortest. In the step S46, it is determined whether or not a difference between the minimal cumulative time Tm_min (=Tm_c) and the cumulative time Tm_a of the communication unit 13a is a reference time Tm_ref or longer.

When the aforementioned difference is smaller than the reference time Tm_ref, this processing is terminated. On the other hand, when the difference is larger than the reference time Tm_ref, this processing proceeds to a step S47. In the step S47, in order that the master itself is changed into the slave mode and a communication unit (communication terminal 13c in the present embodiment) of which the above-mentioned cumulative time Tm is the shortest is brought into the master mode, the communication unit 13a transmits a master/slave switching request packet (LMP_switch_req) to the communication unit 13c.

Hereinafter, the communication sequence as described with reference to FIG. 11 is executed, resulting that the communication unit 13a which has been operating in the master mode is changed into the slave mode while the communication unit 13c which has been operating in the slave mode is changed into the master mode.

According to the sixth embodiment, a cumulative time of operating in the master mode is determined in each of the communication units and the master mode is assigned to a communication unit with shortest cumulative time that is, a communication unit of which the remaining battery is expected to be maximum. Therefore, it is possible to prevent uneven battery decrease only for a part of communication units.

According to the present invention the following effects can be achieved:

(1) Not only a communication unit operating in the slave mode but also a communication unit operating in the master mode can be changed into a suspend state. Therefore, in a radio communication system in which the communication units are battery-operated, it is possible to prevent sharp decrease of the battery from occurring only in a communication unit operating in the master mode, thereby assuring longer battery operating times in the whole communication system.

(2) Since operation modes of the respective communication units can be switched at predetermined intervals, an operating time as master can be provided evenly to the communication units. Therefore, it is possible to present unevenness decrease in battery such that a battery of only a part of communication units is decreased.

(3) An operation maintaining estimated time when an actual operation mode is maintained is determined for each of the communication units, and a master mode is assigned to a communication unit of which the operation maintaining estimated time is the longest. Therefore, even if power consumption in each operation mode is different in the communication units, it is possible to assign the master mode to an appropriate communication unit.

(4) A remaining battery life is determined in each of the communication units and the master mode is assigned to a communication unit with the maximal remaining battery life. Therefore, it is possible to present uneven decrease in battery such that a battery of only a part of communication units is decreased.

(5) A cumulative time of operating in the power saving mode is determined in each of the communication units and the master mode is assigned to a communication unit with the longest cumulative time, that is, a communication unit of which the remaining battery life is expected to be maximum. Therefore, it is possible to prevent uneven battery decrease only for a part of communication units.

(6) A cumulative time of operating in the master mode is determined in each of the communication units and the master mode is assigned to a communication unit with shortest cumulative time that is, a communication unit of which the remaining battery life is expected to be maximum. Therefore, it is possible to prevent uneven battery decrease only for a part of communication units.

What is claimed is:

1. A radio communication system comprising:
   a plurality of communication units in a radio network, wherein one of the plurality of communication units is a master and operates in a master mode and other communication units are slaves and operate in a slave mode,
   wherein a transition into a Sniff mode is allowed during operation in the slave mode,
   wherein each of the plurality of communication units includes a battery as driving power,
   wherein each slave in the Sniff mode communicates with the master during a Sniff duration in every Sniff period, and each Sniff duration includes two or more Sniff slots,
   wherein the communication unit operating in the master mode stops transmission/reception operations in synchronization with all slaves in the Sniff mode which are out of the Sniff duration, and
   wherein the Sniff periods of the communication units operating in the slave mode are substantially in synchronization and in phase with each other or out of chase with each other.

2. The radio communication system according to claim 1, wherein the radio network is in an intercommunication system.

3. The radio communication system according to claim 1, wherein the radio network is a Personal Area Network which utilizes Bluetooth.

4. The radio communication system according to claim 1, wherein the communication units operating in the slave mode are all transitioned into the Sniff duration substantially in synchronization with each other.

5. The radio communication system according to claim 1, wherein the Sniff duration of the communication units operating in the slave mode are sequential.

6. The radio communication system according to claim 1, wherein the master mode and the slave mode are switched so as to equalize remaining battery life of the communication units.

7. The radio communication system according to claim 6, wherein
   each of the communication units comprises:
   means for calculating an operation maintaining time in the master mode,
   wherein when the operation maintaining time becomes longer than a predetermined reference time, the master mode and the slave mode are switched between the communication unit operating in the master mode and one of the communication units operating in the slave mode.

8. The radio communication system according to claim 6, wherein
   each of the communication units comprises:
   means for detecting a remaining battery life; and
   means for exchanging information about a detected remaining battery life with other communication units,
   wherein the master mode is assigned to a communication unit of which a remaining battery life is relatively high.

9. The radio communication system according to claim 6, wherein
   each of the communication units comprises:
   means for calculating an operation maintaining estimated time in an actual operation mode; and
   means for exchanging information about the operation maintaining estimated time with other communication units,
   wherein the master mode is assigned to a communication unit of which an operation maintaining estimated time is relatively long.

10. The radio communication system according to claim 6, wherein
    each of the communication units comprises:
    means for calculating a cumulative time of operating in a master mode; and
    means for exchanging information about the cumulative time with other communication units,
    wherein the master mode is assigned to a communication unit of which a cumulative time is relatively short.

11. The radio communication system according to claim 6, wherein
    each of the communication units comprises:
    means for calculating a cumulative time of operating in a power saving mode; and
    means for exchanging information about the cumulative time with other communication units,
    wherein the master mode is assigned to a communication unit of which a cumulative time is relatively long.

12. The radio communication system according to claim 6, wherein the battery is a lithium ion battery.

13. A radio communication system comprising:
    a plurality of communication units in a radio network, wherein one of the plurality of communication units is a master and operates in a master mode and other communication units are slaves and operate in a slave mode,
    wherein a transition into a power saving mode is allowed during operation in the slave mode and a transition into the power saving mode is forbidden during operation in the master mode,
    wherein each of the plurality of communication units includes a battery as driving power, wherein each slave in the power saving mode communicates with the master periodically during a communication duration, and wherein each of the communication units comprises:

means for calculating a cumulative time of operating in the master mode; and means for exchanging information about the cumulative time with other communication units, wherein the master mode is assigned to one of the plurality of communication units of which the cumulative time is relatively short, wherein the communication unit operating in the master mode switches roles with the communication unit having the shortest cumulative time when the cumulative time of the communication unit operating in the master mode is longer than the shortest cumulative time among the exchanged cumulative times by at least a predetermined switching reference time.

14. The radio communication system according to claim 13, wherein the battery is a lithium ion battery.

15. The radio communication system according to claim 13, wherein each of the communication units is in conformity with Bluetooth standards.

16. A radio communication system comprising:

a plurality of communication units in a radio network, wherein one of the plurality of communication units is a master and operates in a master mode and other communication units are slaves and operate in a slave mode, wherein a transition into a power saving mode is allowed during operation in the slave mode and a transition into the power saving mode is forbidden during operation in the master mode, wherein each of the plurality of communication units includes a battery as driving power, wherein each slave in the power saving mode communicates with the master periodically during a communication duration, and wherein each of the communication units comprises:

means for calculating a cumulative time of operating in power saving mode; and means for exchanging information about the cumulative time with other communication units, wherein the master mode is assigned to one of the plurality of communication units of which the cumulative time is relatively long wherein the communication unit operating in the master mode switches roles with the communication unit having the longest cumulative time when the longest cumulative time among the exchanged cumulative times is longer than the cumulative time of the communication unit operating in the master mode by at least a predetermined switching reference time.

17. The radio communication system according to claim 16, wherein the battery is a lithium ion battery.

18. The radio communication system according to claim 16, wherein each of the communication units is in conformity with Bluetooth standards.

19. A radio communication system comprising:

a plurality of communication units in a radio network, wherein one of the plurality of communication units is a master and operates in a master mode and other communication units are slaves and operate in a slave mode, wherein a transition into a power saving mode is allowed during operation in the slave mode, wherein each slave in the power saving mode communicates with the master periodically during a communication duration, wherein the communication unit operating in the master mode stops transmission/reception operations in synchronization with all slaves in the power saving mode which are out of the communication duration, and wherein each of the communication units comprises:

means for calculating a cumulative time of operating in the power saving mode; and means for exchanging information about the cumulative time with other communication units, and wherein the communication unit operating in the master mode switches roles with the communication unit having the longest cumulative time when the longest cumulative time among the exchanged cumulative times is longer than the cumulative time of the communication unit operating in the master mode by at least a predetermined switching reference time.

20. The radio communication system according to claim 19, wherein the battery is a lithium ion battery.

21. The radio communication system according to claim 19, wherein each of the communication units is in conformity with Bluetooth standards.

* * * * *